United States Patent [19]
Billy

[11] Patent Number: 5,133,793
[45] Date of Patent: Jul. 28, 1992

[54] PROCESS AND APPARATUS FOR THE SIMULTANEOUS PRODUCTION OF METHANE AND CARBON MONOXIDE

[75] Inventor: Jean Billy, Le Plessis Trevise, France

[73] Assignee: L'Air Liquide, Societe Anonyme pour l'Etude et L'Exploitation des Procedes Georges Claude, Paris, France

[21] Appl. No.: 724,141

[22] Filed: Jul. 1, 1991

[30] Foreign Application Priority Data

Jul. 4, 1990 [FR] France ................. 90 08464

[51] Int. Cl.⁵ ............... F25J 3/06; F25J 3/02
[52] U.S. Cl. .......................... 62/23; 62/24; 62/25; 62/28
[58] Field of Search ........ 62/9, 11, 23, 24, 25, 62/28

[56] References Cited

U.S. PATENT DOCUMENTS

| | | | |
|---|---|---|---|
| 4,217,759 | 8/1980 | Shenoy | 62/23 X |
| 4,596,588 | 6/1986 | Cook | 62/28 X |
| 4,600,421 | 7/1986 | Kummann | 62/25 |
| 4,617,039 | 10/1986 | Buck | 62/28 X |
| 4,676,812 | 6/1987 | Kummann | 62/28 X |
| 4,711,651 | 12/1987 | Sharma et al. | 62/23 X |
| 4,805,414 | 2/1989 | Fisher | 62/28 |
| 4,888,035 | 12/1989 | Bauer | 62/24 X |
| 4,923,493 | 5/1990 | Valencia et al. | 62/28 X |
| 4,966,612 | 10/1990 | Bauer | 62/24 |
| 5,026,408 | 6/1991 | Saunders et al. | 62/28 X |

FOREIGN PATENT DOCUMENTS

| | | |
|---|---|---|
| 0017297 | 10/1980 | European Pat. Off. . |
| 0317851 | 5/1989 | European Pat. Off. . |
| 0340465 | 8/1989 | European Pat. Off. . |
| 1304568 | 1/1973 | United Kingdom . |

*Primary Examiner*—Henry A. Bennet
*Assistant Examiner*—Christopher B. Kilner
*Attorney, Agent, or Firm*—Curtis, Morris & Safford

[57] ABSTRACT

The liquid in the vat portion of the hydrogen withdrawing column is sub-cooled, expanded and divided into three flows: a first flow which is sent directly at about its bulb temperature into the column for separating CO and CH₄, a second flow which is vaporized and warmed up to its dew point and is introduced at that temperature into the separation column and a third flow which is vaporized and warmed to a temperature which is intermediate between said bulb and dew temperatures and which is introduced into the separation column at that intermediate temperature. Application to the production of carbon monoxide and methane from a gas for reforming hydrocarbons.

6 Claims, 1 Drawing Sheet

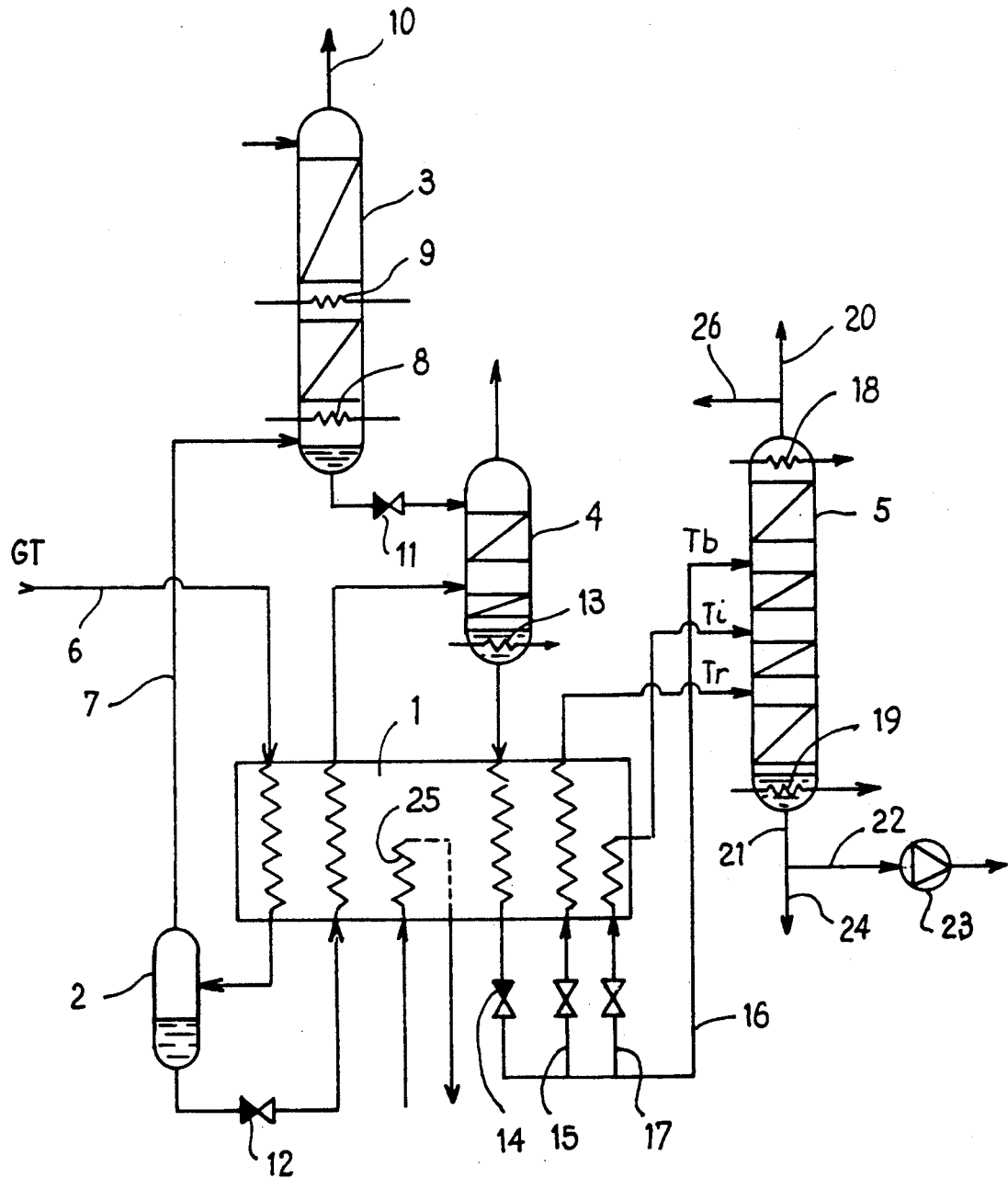

PROCESS AND APPARATUS FOR THE SIMULTANEOUS PRODUCTION OF METHANE AND CARBON MONOXIDE

BACKGROUND OF THE INVENTION (a) Field of the Invention

The present invention concerns the production of methane and carbon monoxide. It relates first to a process for the simultaneous production of methane and carbon monoxide from a treated gas essentially consisting of these two components and hydrogen, of the type in which the treated gas is cooled and partiallly condensed to constitute a vapor phase and a liquid phase, the liquid phase being expanded, vaporized, warmed and introduced into a column for withdrawing hydrogen; the liquid from the vat portion of this column is sub-cooled, expanded and divided into a plurality of flows; one of these flows is vaporized and warmed up to its dew temperature and is introduced into a column for the separation of CO and $CH_4$, and another one of these flows is introduced into this same column at about its bulb temperature; and a cold input is supplied by means of an outside refrigerating cycle.

(b) Description of Prior Art.

Usually, there are two said flows, and consequently, the column for the separation of CO and $CH_4$ is supplied at two locations. It is observed that the heat exchange diagram (enthapies in ordinates, temperatures in abscissae) of the countercurrent indirect heat exchanger which is used to produce the various coolings, vaporizations and warmings, is very opened in the hot portion, the temperature ranges being of the order of 15° C. at the hot end. This corresponds to a relatively important irreversability of the process, and the invention aims at reducing this irreversability in order to make the entire treatment more economical with respect to energy consumption.

SUMMARY OF INVENTION

For this purpose, it is an object of the invention to provide a process of the type mentioned above, characterized in that said sub-cooled and expanded vat liquid is divided into three flows, the third flow being vaporized and warmed up to an intermediate temperature between said dew and bulb temperatures and is introduced while at that intermediate temperature into the column for the separation of CO and $CH_4$.

According to other characteristics:

said vapor phase is washed with liquid methane in a third column to give a head gas essentially consisting of hydrogen, and a vat liquid, the latter also being expanded and introduced into the column for withdrawing hydrogen, a portion of the liquid methane produced in the vat portion of the column for the separation of CO and $CH_4$ being used to wash with methane;

the refrigerating cycle is a carbon monoxide cycle, the carbon monoxide required for the operation of this cycle being withdrawn from the head portion of the column for the separation of CO and $CH_4$.

It is also an object of the invention to provide an apparatus enabling to carry out such a process. This apparatus, of the type comprising a heat exchanger, a phase separator, a column for withdrawing hydrogen and a column for the separation of CO and $CH_4$; means for cooling and partially condensing the gas treated and introducing same into the phase separator to constitute a vapor phase and a liquid phase; means for expanding, vaporizing and warming the liquid phase and introducing same into the column for withdrawing hydrogen; means for sub-cooling expanding and dividing the vat liquid of this column into a plurality of flows; means for warming one of these flows up to its dew temperature and for introducing same into the column for the separation of CO and $CH_4$; means for introducing another one of these flows into this same column at about its bulb temperature; and a refrigerating cycle supplying an amount of cold, said apparatus being characterized in that said sub-cooled and expanded vat liquid is divided into three flows, and in that there are provided means for vaporizing and warming the third flow up to a temperature which is intermediate between said dew and bulb temperatures and for introducing same at that intermediate temperature into the column for the separation of CO and $CH_4$.

BRIEF DESCRIPTION OF DRAWINGS

An embodiment of the invention will now be described with reference to the annexed drawings, in which the single FIGURE is a schematic representation of an apparatus for the production of CO and $CH_4$ according to the invention.

DESCRIPTION OF PREFERRED EMBODIMENTS

The apparatus which is illustrated in the drawing essentially comprises an indirect heat exchanger 1 for the countercurrent circulation of the fluids which are under heat exchange relationship, a phase separator 2, a column 3 for washing with methane, a column 4 for withdrawing hydrogen and a column 5 for the separation of CO and $CH_4$. The pressures indicated below are approximate absolute pressures and, as in the case of the indicated temperatures, are given only by way of numerical examples.

The gas treated (GT) is a gas mixture essentially consisting of hydrogen, carbon monoxide and methane. It is produced for example by pre-cooling down to about $-140°$ C. a gas for the catalytic reforming of hydrocarbons, of which the other components have been removed by condensation during this pre-cooling.

The gas treated arrives at about 26 bars into the apparatus via a duct 6, passes through the exchanger 1 from its hot end to its cold end, from which it exits at $-180°$ C., in partially condensed form, to be separated into a liquid phase and a vapor phase in the separator 2.

The vapor phase is sent via a duct 7 in the vat portion of the washing column 3, which is supplied in the head portion thereof with liquid methane and is kept generally isothermal along its entire length by means of condensers 8, 9 provided at appropriate heights.

A flow of gaseous hydrogen which is free from CO and contains about 1% $CH_4$ is produced in the head portion of column 3 via a duct 10, and the vat liquid, essentially consisting of CO and $CH_4$ but containing a small fraction of dissolved hydrogen, is expanded in an expansion valve 11 and introduced in the head portion of the head column 4, which operates at about 10 bars.

The liquid phase collected in the separator 2 is expanded at about 10 bars in an expansion valve 12, it is vaporized and warmed up from the cold end to the hot end of the exchanger 1, and is introduced at an intermediate height into the column 4.

Column 4, warmed up in the vat portion by means of a re-boiler 13, produces in the head portion a gas consisting of hydrogen containing a small fraction of CO and $CH_4$, and in the vat portion a liquid mixture of these two elements, which is free of hydrogen. This liquid is sub-cooled from the hot end to the cold end of the exchanger 1, expanded at about 2.6 bars in an expansion valve 14, and divided into three flows:

a first flow, carried by duct 15, is vaporized and warmed from the cold end to the hot end of the exchanger up to its dew temperature Tr, for example $-154°$ C., and is introduced at that temperature at an intermediate height of the column 5;

a second flow, which is carried by duct 16, is directly introduced into the column 5 at about its bulb temperature Tb, for example at about $-180°$ C., and therefor above the first flow; and a third flow, carried by a duct 17, is vaporized and warmed in the exchanger 1, up to an intermediate temperature Ti between Tr and Tb; at that temperature Ti, it exits from the exchanger and is introduced into the column 5, between the two feeds at Tr and Tb; the temperature Ti is for example in the vicinity of the average of temperatures Tr and Tb, for example of the order of $-165°$ C.

Column 5 comprises a head condenser 18 and a vat re-boiler 19. It produces in the head portion, via duct 20, gaseous CO, and in the vat portion, via duct 21, liquid $CH_4$. A portion of this methane is withdrawn via duct 22, is compressed by means of a pump 23, and, after sub-cooling (not illustrated) at $-180°$ C., is sent at the top of column 3, and the remainder, which is evacuated via a duct 24, constitutes the production of methane with the apparatus.

A cold input is supplied to the apparatus by means of a CO cycle operating between a high pressure of 28 bars and a low pressure of 2.6 bars. In the drawing, only some elements of this cycle have been illustrated, namely condensers 13 and 19 used as re-boilers in the vat portion of the columns 4 and 5, evaporators 8, 9, used as condensers in column 3, evaporator 18 used as head condenser of column 5, and an evaporator 25 provided in the cold portion of the exchanger 1. The carbon monoxide required for the good operation of this cycle is taken from the production of CO of the apparatus, i.e. on a duct 26 along duct 20.

With respect to a similar apparatus in which there is no duct 17, the gain of compression energy of the CO cycle is of the order to 8%. This can be shown for example by means of a diagram of heat exchange substantially tighter in the hot portion of the exchanger 1.

We claim:

1. Process for the simultaneous production of methane and carbon monoxide from a treated gas essentially consisting of these components and hdyrogen, of the type in which the treated gas is cooled and partially condensed to produce a vapor phase and a liquid phase, the liquid phase being expanded, vaporized, warmed up and introduced into a column for withdrawing hydrogen; the liquid from the vat portion of this column is sub-cooled, expanded and divided into a plurality of flows; one of these flows is vaporized and warmed up to its dew temperature and is introduced into a column for the separation of CO and $CH_4$, and another one of these flows is introduced into this same column at about its bulb temperature; and an input of cold is supplied by means of an external refrigerating cycle; wherein in said vat liquid which is sub-cooled and expanded is divided into three flows, the third flow being vaporized and warmed up to a temperature which is intermediate between said dew and bulb temperatures and is introduced while at said intermediate temperature into the column for the separation of CO and $CH_4$.

2. Process according to claim 1, wherein said vapor phase is washed away with a liquid methane in a third column to produce a head gas essentially consisting of hydrogen and a vat liquid, the latter being also expanded and introduced into the column for withdrawing hydrogen, a portion of the liquid methane produced in the vat portion of the column for the separation of CO and $CH_4$ being used to wash with methane.

3. Process according to claim 1, wherein the refrigerating cycle is a carbon monoxide cycle, the carbon monoxide required for the operation of this cycle being taken from the production in the head portion of the column for the separation of CO and $CH_4$.

4. Apparatus for the simultaneous production of methane and carbon monoxide from a treated gas which essentially consists of these two elements and hydrogen, of the type comprising a heat exchanger, a phase separator, a column for withdrawing hydrogen and a column for the separation of CO and $CH_4$, means for cooling and partially condensing the treated gas and introducing same into the phase separator to give a vapor phase and a liquid phase, means for expanding, vaporizing and warming the liquid phase and introducing same into the column for withdrawing hydrogen; means for sub-cooling, expanding and dividing the liquid from the vat portion of this column into a plurality of flows; means for warming up one of these flows up to its dew temperature and introducing same into the column for the separation of CO and $CH_4$; means for introducing another one of these flows into this same column at about its bulb temperature; and a refrigerating cycle supplying an input of cold, wherein said sub-cooled and expanded vat liquid is divided into three flows, and means are provided for vaporizing and warming the third flow up to a temperature which is intermediate between said dew and bulb temperatures and for introducing same at that intermediate temperature into the column for the separation of CO and $CH_4$.

5. Apparatus according to claim 4, which comprises a column for washing said vapor phase with methane, means for expanding the vat liquid from this column, means for introducing this expanded liquid into the column for withdrawing hydrogen, and means for compressing and introducing into the head portion of the washing column, a portion of the liquid methane produced in the bottom part in the vat portion of the column for the separation of CO and $CH_4$.

6. Apparatus according to claim 5, wherein the refrigerating cycle is a carbon monoxide cycle, the carbon monoxide required for the operation of this cycle being taken from the production of the head portion of the column for the separation of CO and $CH_4$.

* * * * *